Patented July 23, 1929.

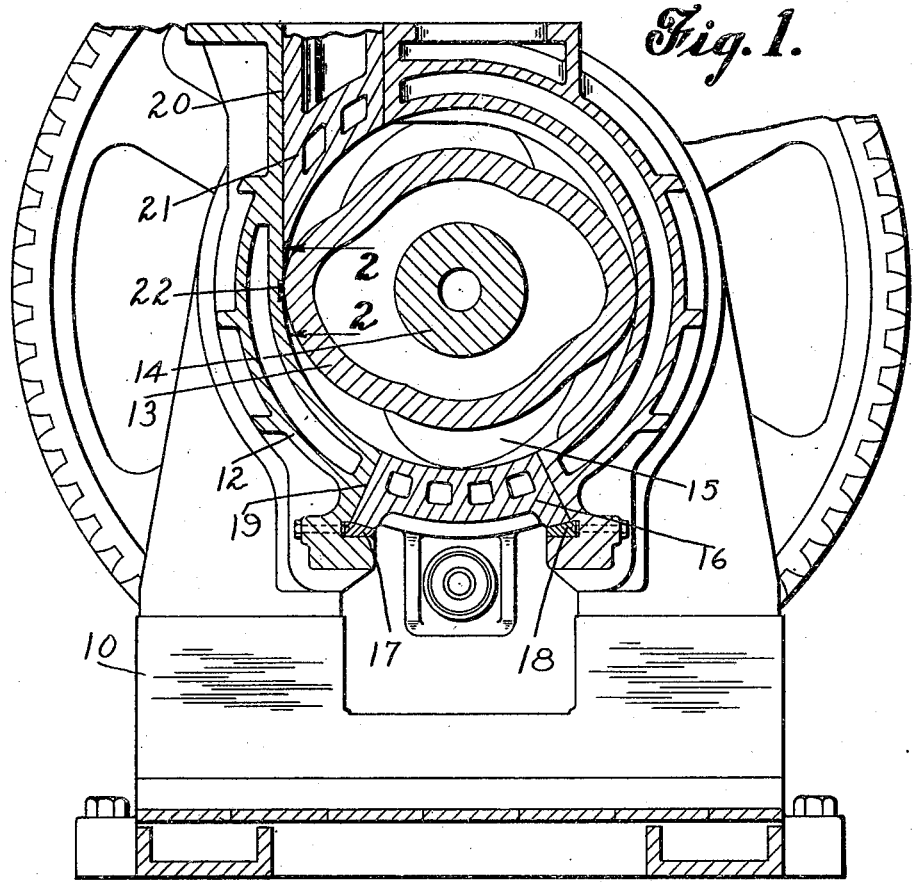
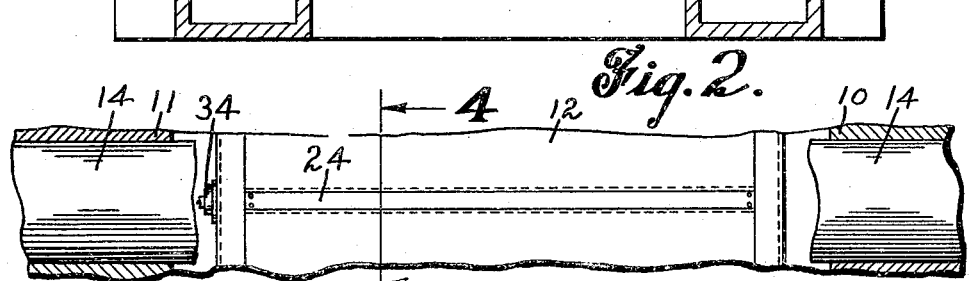
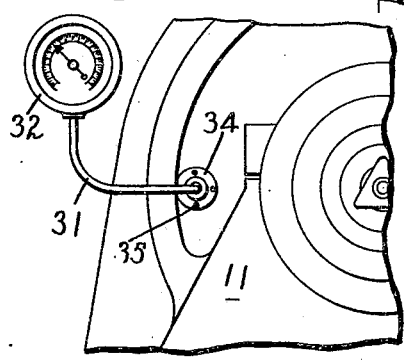

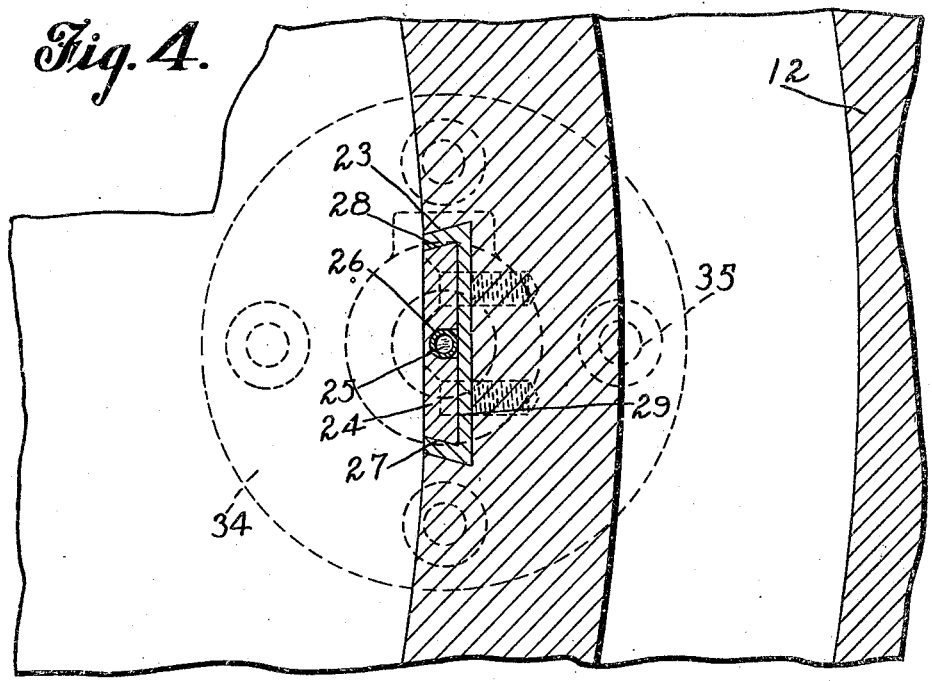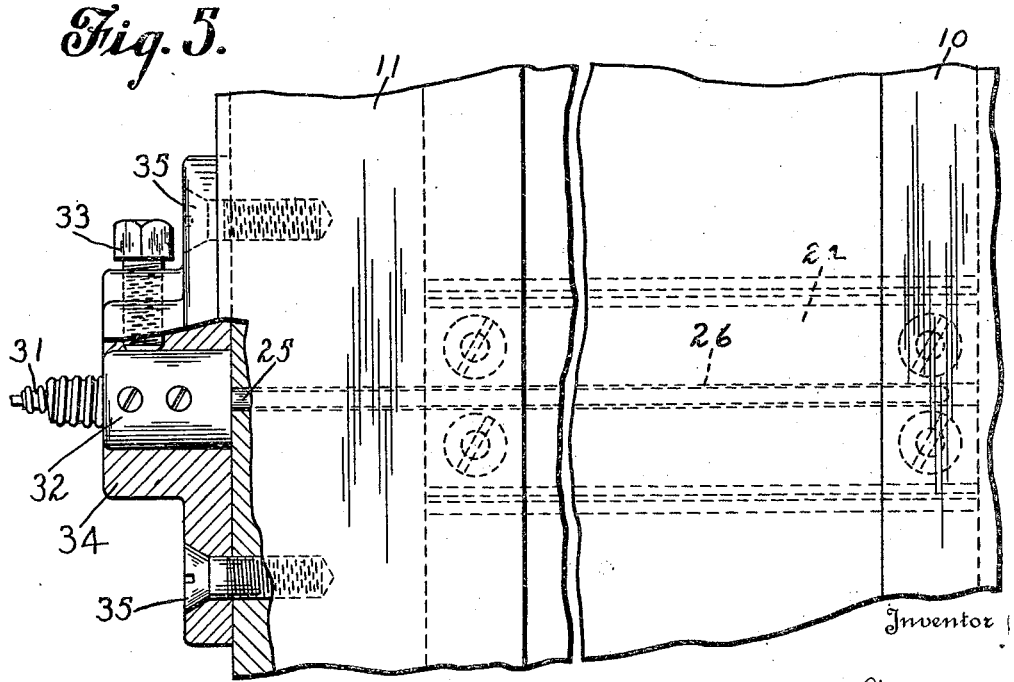

1,721,962

UNITED STATES PATENT OFFICE.

RICHARD C. LEWIS, OF ANSONIA, CONNECTICUT, ASSIGNOR, BY MESNE ASSIGNMENTS, TO FARREL-BIRMINGHAM COMPANY, INCORPORATED, OF ANSONIA, CONNECTICUT, A CORPORATION OF CONNECTICUT.

MACHINE FOR TREATING RUBBER AND SIMILAR MATERIAL.

Application filed March 10, 1925. Serial No. 14,452.

This invention relates to machines for treating rubber and similar material, and is illustrated in the drawings as applying to a machine for mixing, masticating, or kneading rubber which is to be used for various industrial purposes. In such machines it is advantageous for the operator to know the temperature obtaining within the chamber, and my invention contemplates the mounting of a temperature measuring device in the chamber wall in such a position that it will be exposed to the temperature therein, and at the same time will not be broken nor interfere with the operation of the machine in any way. The temperature responsive element, while exposed to and adapted to correctly respond to the temperature obtaining within the chamber, is protected from contact with this material, and is also insulated from the chamber wall so that it will give a more accurate indication of the temperature within the chamber.

Connections are provided which extend without the chamber so that the temperature may be indicated or recorded where it may be plainly seen by the operator.

It will be understood that while the invention as shown is applied to a rubber mixing machine, the principles thereof will be applicable to other mixing machines of like nature as well.

One object of my invention is the provision of a rubber mixing machine having a temperature measuring device mounted at the inner surface of the chamber wall in such a position that it will be exposed to and most directly affected by the temperature within the chamber.

Another purpose is to protect the thermometer from breakage in the operation of the machine.

Another object of my invention is the provision of a material mixing machine having a thermometer mounted at the inner surface of the chamber wall in a position to be exposed to the temperature obtaining within the chamber and insulated from the wall of the chamber.

A further object of my invention is the provision of a temperature indicating device for a rubber mixing machine comprising a temperature responsive element mounted in a heat conducting element, the latter in turn being mounted in an insulating casing which partially covers the conducting element but leaves a portion of the surface exposed.

A still further object of my invention is the provision of a rubber mixing machine having a recess in the chamber wall opening through the inner surface thereof into the chamber, and a temperature indicating device mounted in this recess in a position to be exposed to the temperature within the chamber without interfering with the operation of the machine.

To these and other ends the invention consists in the novel features and combination of parts to be hereinafter described and claimed.

In the accompanying drawings:

Fig. 1 is a sectional view of a rubber treating machine embodying my invention;

Fig. 2 is a fragmentary view of the inner surface of the chamber wall looking in the direction of the arrows 2—2 of Fig. 1;

Fig. 3 is a partial end view of the rubber mixing machine;

Fig. 4 is an enlarged sectional view on line 4—4 of Fig. 2;

Fig. 5 is an enlarged view similar to Fig. 2.

The rubber treating machine in connection with which I have selected to illustrate and describe my invention, consists of end walls or pedestals 10 and 11, between which is supported a chamber 12. The chamber as shown is of substantially cylindrical shape, and within the chamber is mounted a rotor 13 upon the rotor shaft 14, the rotor in its operation working the material back and forth within the chamber and against the walls thereof to mix and knead it.

While the precise shape of the chamber may be varied, if desired, it will preferably have, of course, a curved surface to coact with the blades 15 upon the rotor to properly act upon the material to be mixed.

A discharge door 16 is mounted at the bottom of the chamber, this door sliding upon ways or blocks 17 and 18 to permit the charge within the chamber to drop through the opening 19 at the lower portion of the chamber when the mixing operation as been completed.

As shown, the chamber is provided with an upper charging chute 20, controlled by a sliding plunger 21, through which chute the charging of the material into the chamber is accomplished.

In order to apprise the operator of the temperature obtaining within the chamber, I propose to mount at the inner surface of the chamber wall a temperature measuring device or thermometer 22. In order that this device may be exposed to the material within the chamber and the temperature thereof, and at the same time not interfere with the operation of the machine, I preferably provide a recess 23 in the chamber wall, and, as shown in Fig. 4, this recess opens through the inner surface of the wall into the chamber. As also shown in Fig. 4, this recess is of dove-tailed form in cross-section, the mouth thereof being narrower than the base, and as the temperature measuring device is similarly shaped, it will be apparent that this device may be slipped within the recess endwise and that there will be no danger of its being drawn out into the chamber so as to be caught by the rotor.

The temperature measuring device comprises a thermobulb strip 24 and a thermobulb or heat responsive element 25. This strip may be made of heat conducting metal of suitable nature, and is provided with a seat 26 in the form of a groove opening through the rear face thereof in which the heat responsive element 25 is mounted. The sides 27 and 28 of the conductor strip are preferably slightly bevelled, and this strip, together with the heat responsive element or bulb 25, is slipped endwise into a heat insulating casing 29, channel-shaped in cross section, the mouth of the channel, however, being slightly narrower than the base thereof to conform with the bevelled sides 27 and 28 of the conductor strip so that the parts will be held together when assembled.

The bulb 25 may be of any preferred form so long as it is a heat responsive element of some suitable character. I prefer, however, to use a copper tube, which tube is filled with gas, the expansion and contraction of the gas being carried through the connection 31 to a temperature indicating device 32 positioned where it may be readily seen by the operator. It is also entirely practical to use a mercury bulb or a pyrometer.

The groove 23 and the conducting and insulating members 24 and 29 preferably extend substantially throughout the length of the chamber, although the dimensions thereof may be varied if desired, and terminate at the inner surface of the end walls of the chamber. The heat responsive element 25, as shown in Fig. 5, extends through the end wall 11, and the projecting end of this element is mounted within a plug 32, the plug being secured by means of a set-screw 33 within a bore in a flange 34. This flange is secured by means of suitable fastening members 35 to the end wall of the casing so that the tube 25 is securely held in place, and the connections 31 to the indicating device are suitably supported.

As shown, the thermometer is mounted in a horizontal position within the chamber substantially parallel to the rotor shaft. The proportions of the thermometer groove 23 formed within the chamber wall are such that the inner face of the conductor strip 24 is substantially flush with the inner surface of the chamber wall. The insulating casing 29, which may be of any material suitable for this purpose, such as bakelite, for example, encloses the conductor strip upon three sides of the latter, so as to completely insulate it from the casing wall, and at the same time leave the face exposed to the temperature within the chamber. The copper tube or heat responsive element will preferably make a substantially close fit within the groove or recess 26 so that the tube is in contact with the metal of the strip 24 and accurately respond to the changes of temperature within the chamber. When this tube is in contact with the conductor strip, it will be apparent that the temperature of the chamber will be conducted directly thereto, and a more accurate result will be obtained than if an air space were left between these two elements which would insulate the heat responsive element to a great extent.

It is apparent, of course, that by mounting the thermometer in the chamber wall in a substantially flush position, as described, there will be no substantial projection of the instrument into the chamber. Hence, the mixing or masticating space in the chamber is fully retained and at the same time, breakage of the temperature indicating device is reduced to a minimum. In cases where a thermometer has extended into the mixing chamber with a finger-like projection, it has been almost impossible to prevent the same from being broken off when caught by the heavy material being acted on by the rotor, notwithstanding the fact that it has been common to surround such thermometers by a heavy protective armor. By arranging them in the ordinary way, moreover, the transmission of heat from the material to the thermometer tube has been interfered with to a substantial extent. In my device, on the other hand, the thermometer is afforded secure protection from breakage at the same time that transmission of heat is facilitated.

I do not claim herein any features pertaining to the construction of the mixing chamber, as the same are claimed in my application, Serial No. 14,451 filed of even date.

While I have shown and described a preferred embodiment of my invention, it will be understood that it is not to be limited to all the details shown, but is capable of modification and variation within the spirit of the invention and within the scope of the appended claims.

What I claim is:—

1. In a material mixing machine, a mixing chamber, a relatively shallow slot cut in one of the interior material contacting walls of said chamber inwardly from an end thereof, a heat responsive element imbedded in said slot, and having a part thereof extending to the exterior of the machine, said heat responsive element being partly surrounded and secured against displacement by the unbroken chamber wall forming the sides and bottom of the slot, and means on the exterior of said chamber for indicating the temperature conditions in the heat responsive element.

2. In a material mixing machine, a mixing chamber, a slot in an interior wall of said chamber extending inwardly from one end thereof, a heat responsive element inserted into said slot through the end thereof, means closing the end of said slot, and means carried on the exterior of the mixing machine and connected to said heat responsive element for indicating the temperature conditions in the heat responsive element.

3. In a material mixing machine, a mixing chamber, a dovetailed slot in an interior wall of said chamber extending inwardly from one end thereof, a thermometer shaped to fit said slot and inserted therein through the open end of the slot, means for closing the open end of the slot, and means carried on the exterior of said machine for indicating the temperature conditions in said thermometer.

4. In a material mixing machine, a chamber, the wall of said chamber being provided with a recess opening through its inner face, a heat insulating strip mounted in said recess, a heat conducting strip mounted in said insulating strip and having an outer surface flush with the surface of the wall in which the recess is provided, a heat responsive element mounted between said strips, and means for securing said strips together, said means comprising converging side walls on said insulating strip embracing the conducting strip.

5. In a material mixing machine, a chamber, the wall of said chamber being provided with a recess opening through the inner surface thereof and substantially coincident in length with the chamber, a heat conducting element seated in said recess and substantially closing the mouth of said recess flush with the inner surface of the chamber, and a heat responsive element substantially coincident in length with the chamber mounted in said conducting member below the inner surface thereof so as to be protected thereby from contact with the material within the chamber.

6. In a material mixing machine, a chamber, the wall of said chamber being provided with a recess opening through the inner surface thereof and substantially coincident in length with the chamber, a heat conducting element seated in said recess and substantially closing the mouth of said recess flush with the inner surface of the chamber, and a heat responsive element substantially coincident in length with the chamber mounted in said conducting member and protected thereby from contact with the material within the chamber, and means to insulate said member and element from the chamber wall.

7. In a material mixing machine, a chamber, the wall of said chamber being provided with a recess opening through its inner face, said recess being of dove-tail shape in cross-section, and being smaller at the mouth than at the base thereof, a member shaped to conform to said recess and inserted therein from the end thereof, said member carrying a heat responsive element exposed to the temperature of the chamber contents.

8. In a rubber mixing machine, a chamber having a rotor therein, a thermometer mounted at the inner surface of the chamber wall and extending substantially across the chamber substantially parallel to the rotor axis, said thermometer including a heat responsive element extending through the end wall of the chamber, and means to operatively connect said heat responsive element to a temperature indicating device.

9. In a rubber mixing machine, a chamber having a rotor therein, a thermometer mounted at the inner surface of the chamber wall and extending substantially across the chamber substantially parallel to the rotor axis, said thermometer including a heat responsive element extending through the end wall of the chamber, and means upon the end wall of the chamber to hold said heat responsive element in position.

10. In a material mixing machine, a chamber, the wall of said chamber being provided with a recess opening through its inner face, a temperature measuring device seated in said recess, said device comprising a channel shaped heat insulating strip, the channel thereof being of dove-tailed formation in cross-section, a heat conducting strip corresponding in shape to the channel of the insulating strip and mounted therein, a heat responsive element mounted in said conducting strip, and means for mounting said temperature measuring device in said recess with the outer surface thereof flush with the surface of the wall of the chamber in which the recess is provided.

In witness whereof, I have hereunto set my hand this 7th day of March, 1925.

RICHARD C. LEWIS.